United States Patent Office 2,750,578
Patented June 12, 1956

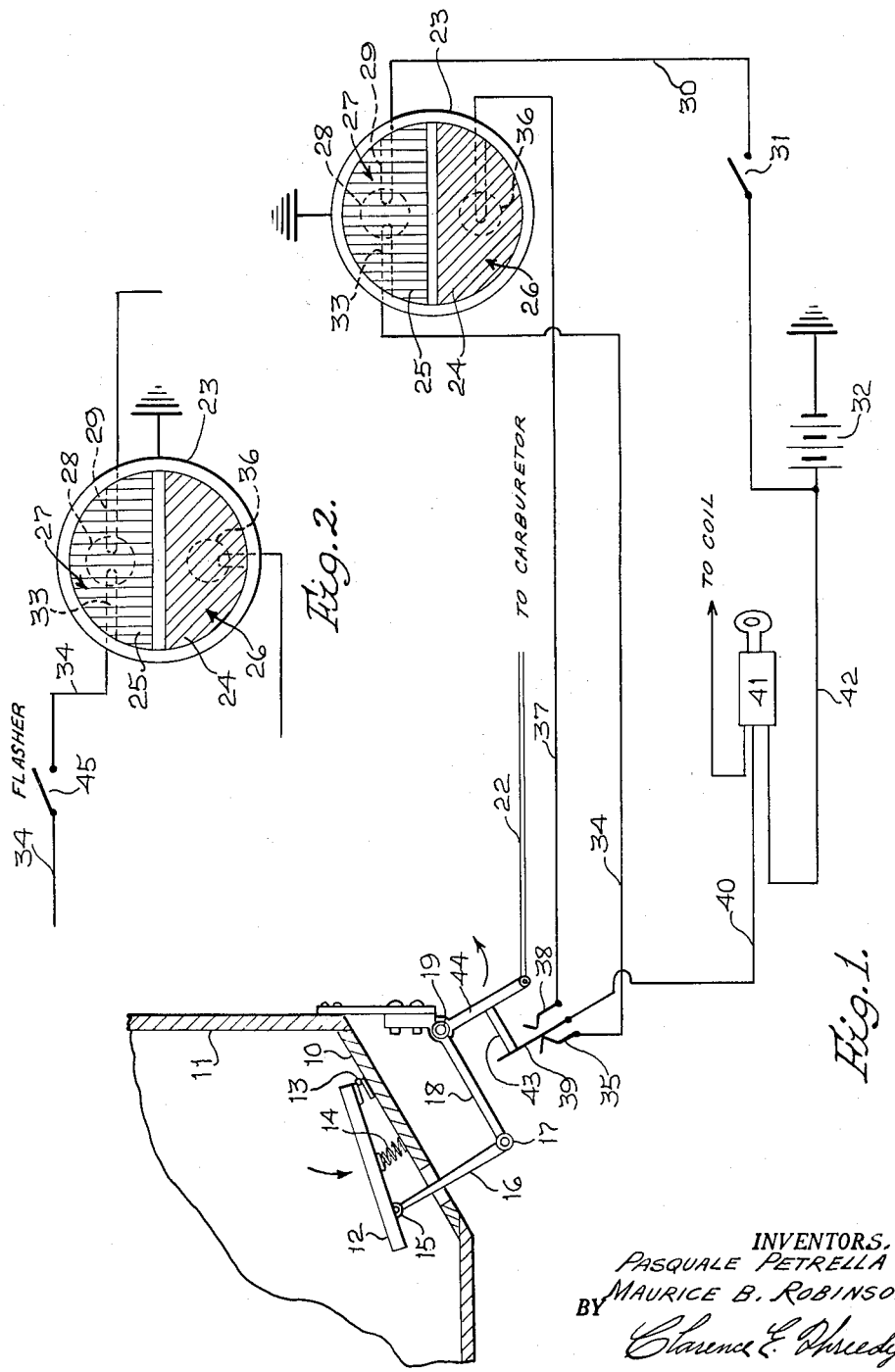

2,750,578

AUTOMOBILE SIGNALS

Pasquale Petrella and Maurice B. Robinson, Chicago, Ill.

Application April 21, 1954, Serial No. 424,614

1 Claim. (Cl. 340—66)

It is a further object of the invention to provide a simple, novel and economically operated signal device, entirely automatic in its operation, by actuation of the foot accelerator of the automobile, to signal from the rear end of the automobile that the same is about to come to a stop or start its movement.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a schematic view of the electrical apparatuses and circuits embodying my invention;

Fig. 2 is a fragmentary schematic view of a modified form of construction of a part of the circuit illustrated in Fig. 1.

The conventional automobile has mounted upon a footboard 10 inwardly of the dashboard 11 a foot accelerator pedal 12 pivoted to the board by a suitable means such for example a hinge 13. The pedal 12 is normally held in elevated position by a spring 14. Pivotally connected as at 15 to the pedal 12 is a link 16 in turn pivotally connected as at 17 to a bell crank 18. This bell crank 18 is pivotally carried as at 19 by a suitable support 20.

One arm of the bell crank is pivotally connected as at 21 to a carburetor control rod 22. A signal light is indicated at 23. This signal light is divided into two compartments 24 and 25. The signal light is arranged within a suitable enclosure and is preferably mounted in a suitable location with respect to the rear end of the vehicle. The signal light 23 includes separate glass plates 26 and 27, the plate 26 being preferably a green plate while the plate 27 is preferably a red plate. Within the compartment 25 is arranged a two-filament incandescent bulb indicated at 28, of different light intensities, the lesser brilliant of these filaments indicated at 29 being connected in what is known as the "tail light circuit" 30 controlled by the conventional light switch 31 arranged adjacent the dashboard of the automobile. The power for this circuit is indicated at 32.

Each of these filaments is grounded to the casing of the signal light 23. The brighter of these filaments is indicated at 33 and by a conductor 34 is connected to a switch element 35.

Arranged in the compartment 26 is an electric bulb 36 likewise having one side grounded to the casing of the signal light 23, the other side of the bulb 36 being connected by a conductor 37 to a switch element 38. A switch element 39 is connected by a conductor 40 to one side of the ignition switch 41, the other side of such switch being connected by a conductor 42 to one side of the power source 32. The switch element 39 is adapted to alternately engage the switch elements 35 and 38. However, when the accelerator pedal 12 is in its inoperative position as shown in Fig. 1, the switch element 39 is held in contact with the switch element 35 through the action of a plunger 43 carried by the arm 44 of the bell crank 18. The switch means comprising the switch elements 35 and 38 is arranged in a suitable enclosure secured within the vehicle in proper relation with respect to the bell crank 18.

As soon as the accelerator pedal 12 is depressed in the direction indicated by the arrow, the switch element 39 will move from contact with the switch element 35 and into contact with the switch element 38. When the switch element 39 is in contact with the switch element 35, the brighter of the filaments indicated at 33 is illuminated, thereby to signal through the red colored plate 27 that the vehicle is coming to a stop. As soon as the switch element 39 is free to move from engagement with the switch element 35 into engagement with the switch element 38, the electric bulb 36 becomes energized to signal through the green colored plate 26 that the vehicle is about to start its travel. As the plate 26 is green, such plate when illuminated will indicate to following drivers that the vehicle embodying our invention is about to start its travel.

By this arrangement the stopping and starting of the automobile is instantaneously signaled by means of the signal light 23. The driver of a following automobile by observing such signal light can become aware when the automobile having embodied therein my signaling device is about to start or stop its travel. By such an arrangement unnecessary accidents by collision can be averted.

In Fig. 2 I have shown incorporated in the conductor line 34 a flasher switch 45. The circuit otherwise remains the same. As will be apparent, the circuit is arranged such that the filament 33 may be energized independent of the energization of the filament 29, the latter which serves as a tail light for night driving.

The circuit comprising the switch element 35, conductor 34, incandescent filament 33, power source 32, conductor 42, ignition key 41, and conductor 40 may for convenience be termed "the stop circuit." The circuit comprising the incandescent lamp 36, conductor 37, switch element 38, conductors 40 and 42, and power source 32 may for convenience be termed "the go circuit."

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claim.

Having thus described our invention, what we claim as new and desire to protect by Letters Patent is:

A signal device for automobiles comprising a two section tail light compartment with each section having a differently colored glass covering, electrically operated signal indicating device in each of said sections with one of said devices having a double electrically operated filament with each filament being of different intensity, a stop circuit for energizing the one filament having the greater intensity of said one device, a tail light circuit for energizing independently the other of said filaments of said one device, a go circuit for energizing the other of said devices for illuminating one of the differently colored glass covering, a flasher switch in said stop circuit for energizing said stop filament of said one device, switch means for alternately controlling energization of said stop and go circuits independently of the tail light circuit, an actuating plunger operatively connected to the foot accelerator pedal of said automobile and actuated to alternately actuate said switch means for energizing said circuits, and a master switch for conditioning said stop and go circuit for energization by said actuating plunger.

References Cited in the file of this patent

UNITED STATES PATENTS

| | | |
|---|---|---|
| 2,260,680 | Nelson | Oct. 28, 1941 |
| 2,275,695 | Stafford | Mar. 10, 1942 |
| 2,526,611 | Rodrick | Oct. 17, 1950 |
| 2,678,978 | Reynolds | May 18, 1954 |